(12) United States Patent
Usuki

(10) Patent No.: US 7,387,477 B2
(45) Date of Patent: Jun. 17, 2008

(54) CONTROLLED ATMOSPHERE CUTTING METHOD USING OXYGEN ENRICHMENT AND CUTTING TOOL

(75) Inventor: Hiroshi Usuki, Matsue (JP)

(73) Assignee: Shimane University, Shimane (JP)

( * ) Notice: Subject to any disclaimer, the term of this patent is extended or adjusted under 35 U.S.C. 154(b) by 451 days.

(21) Appl. No.: 10/784,306

(22) Filed: Feb. 24, 2004

(65) Prior Publication Data

US 2004/0166768 A1 Aug. 26, 2004

(30) Foreign Application Priority Data

Feb. 25, 2003 (JP) .............................. 2003-048315

(51) Int. Cl.
*B23B 35/00* (2006.01)
(52) U.S. Cl. .......................... 409/131; 408/1 R; 408/61; 82/1.11
(58) Field of Classification Search ......... 409/131–132, 409/135–136; 408/1 R, 56, 61; 82/1.11; 451/449, 488
See application file for complete search history.

(56) References Cited

U.S. PATENT DOCUMENTS 3,990,332 A * 11/1976 Flom et al. .................... 82/1.11
6,135,862 A    10/2000 Ukai et al.

FOREIGN PATENT DOCUMENTS

| JP | 59209727 A | * | 11/1984 |
| JP | 05023809 A | * | 2/1993 |
| JP | 11-216636 A1 | | 8/1999 |
| JP | 2000044209 A | * | 2/2000 |
| JP | 2005066786 A | * | 3/2005 |

* cited by examiner

*Primary Examiner*—Daniel W. Howell
(74) *Attorney, Agent, or Firm*—Cheng Law Group PLLC

(57) ABSTRACT

A controlled atmosphere cutting method and a cutting tool are provided to prevent wear on the cutting tool when cutting is performed on a material for forming an oxide protective film.

According to the invention, in a cutting method of supplying gas in an atmosphere of a machining portion to perform cutting when a work piece is cut, gas containing a high concentration of oxygen is supplied as atmospheric gas to bring the machining portion into an oxidized atmosphere, so that an oxide is formed between the cutting edge of a cutting tool 4 and a workpiece and thus a damage and wear are reduced on the tool.

The above-mentioned atmospheric gas is oxygen enriched air in which oxygen in the air is condensed, and the atmospheric gas has an oxygen concentration up to 40%, exceeding an oxygen concentration of the air.

In the body of the tool 4 such as an end mill used for implementing the above method, a gas supply hole 4b connected to the supply side of atmospheric gas is formed in the tool 4, and an exhaust hole 4c of the gas supply hole 4b is opened on the tip of the body of the tool 4, and the exhaust hole 4c is opened in a direction of blowing atmospheric gas to the cutting edge 4a on the cutting blade of the tool 4.

6 Claims, 5 Drawing Sheets

Tool:(Ti,Al)N,coated carbid endmill(6mm)
Work:Ti-6Al-4V
V=50m/min,dr=0.5mm,da=3mm,f=0.015mm/tooth Nitrogen
(4%O₂)

(a)  (b)  (c)

Air
(20.9%O₂)

(a)  (b)  (c)

Oxygen
(32.5%O₂)

(a)  (b)  (c)

Tool: (Ti,Al)N coated carbide end mill (φ 6mm)
Work: Ti-6Al-4V
V=50m/min, dr=0.5mm, da=3mm, f=0.015mm/tooth, L=30m

CONTROLLED ATMOSPHERE CUTTING METHOD USING OXYGEN ENRICHMENT AND CUTTING TOOL

BACKGROUND OF THE INVENTION

1. Field of the Invention

The present invention relates to a controlled atmosphere cutting method using oxygen enrichment and a tool used for the method in a cutting operation performed by a machine tool.

Recently in the field of machine cutting, a cutting technique is demanded for high-efficiency machining, the preservation of nature, the improvement of working environments, and other environmental issues. At present, practical high-speed dry machining is available in the machining field of a small-diameter ball end mill and so on. As a result of an active study of MQL (Minimal Quantity Lubricant) and cold air machining as well as dry machining, a great effect is obtained. These kinds of machining including dry machining will become the mainstream of machining styles in the future. Further, lower machining cost is another major object.

2. Description of the Prior Art

Regarding conventional controlled atmosphere machining which is a kind of dry machining, Japanese Patent No. 2904205 discloses publicly known machining such as cold air machining aimed at an atmosphere of low oxygen. The specification of U.S. Pat. No. 6,135,862 discloses publicly known machining using nitrogen blow at room temperature. Both are performed in an atmosphere of low oxygen to prevent oxidation.

In the former machining, steel is machined by cutting in an atmosphere of inert gas and an oxygen concentration is controlled at about 12%, so that wear on a tool is minimized and a cut surface has the lowest temperature. Particularly in this example, an amount of generated processing heat and solid lubrication of an oxidation product are brought into harmony with each other and a cooling effect and a lubricating effect are achieved by using air. However, a covered container is necessary to obtain an atmosphere, a gas bomb is used for supplying inert gas, and thus problems of cost and workability arise in practical machining.

On the other hand, U.S. Pat. No. 6,135,862 discloses a method in which a device for separating nitrogen gas from the air by a hollow-fiber film is used, nitrogen gas obtained by the device is blown on the cutting edge of a tool, and a steel material is machined in an atmosphere of low oxygen. This method is excellent in practical use and cost.

However, both of the methods are aimed at an atmosphere of low oxygen. Although an atmosphere of low oxygen is generally desirable for a steel material in consideration of prevention of wear caused by oxidation on a tool, some materials such as a titanium alloy considerably become adhesive in an atmosphere of low oxygen and reduce the life of the tool. Moreover, regarding materials which contain a proper amount of a nonmetallic inclusion to form belag and other oxides on a tool and a work material, an atmosphere of low oxygen or a non-oxidative atmosphere are not suitable for stably forming an oxide protective film or adhering the film to a tool.

In addition, as a gas supply nozzle used for controlling an atmosphere of a cut portion, U.S. Pat. No. 6,135,862 discloses a nozzle having a gas supply hole penetrating the shaft of the body of a tool (end mill).

The above configuration is effective to a certain degree because gas is supplied to the cutting edge of the tool in the case where a groove and a hole are formed on a surface of a workpiece. However, in the case of plane cutting and particularly machining of a step-like shape having no cutting material on one side, most atmospheric gas is dispersed to the outer periphery other than the cutting portion of the cutting edge and to a side having no cutting material, so that gas is insufficiently supplied to the cutting edge.

SUMMARY OF THE INVENTION

In order to eliminate or solve the problems, the present invention has as a first object the provision of a controlled atmosphere cutting method and a cutting tool. To be specific, the first object is to provide an atmosphere of high oxygen (enriched oxygen) around the cutting edge of a tool and a workpiece, form an oxide, and reduce a damage on the tool that is caused by adhesion and exfoliation of a cut material on the tool.

Further, in the present invention, in order to stabilize the formation of an oxide protective film when cutting a material added with a small amount of a nonmetallic inclusion, atmospheric gas of high oxygen is used to promote the formation of an oxide.

A second object of the present invention is to promote the formation of an oxide by a coating tool using lubricity of an oxide, reduce adhesion by using a lubricating effect, and increase the life of the tool.

In order to obtain these effects, the present invention extracts oxygen enriched gas from the air or uses an oxygen gas bomb, uses one or both of an internal supply system (center through system or side through system) and an external supply system using a nozzle, and supplies gas around the cutting edge of a cutting tool and a workpiece, so that an oxide is formed in an atmosphere of high oxygen.

According to the method of the present invention for solving the above-described problems, first, in a cutting method of supplying gas in an atmosphere of a machining portion and performing cutting when a workpiece is cut, gas containing a high concentration of oxygen is supplied as atmospheric gas to bring the machining portion into an oxidized atmosphere, so that an oxide is formed between the cutting edge of a cutting tool 4 and a workpiece and a damage and wear are reduced on the tool.

Second, the atmospheric gas is oxygen enriched air in which oxygen in the air is condensed.

Third, the atmospheric gas has an oxygen concentration up to 40%, exceeding an oxygen concentration of the air.

Fourth, the atmospheric gas is supplied to the machining portion by one or two or more of the external supply system for blowing gas from the outside of a cutting device by using a nozzle, a peripheral supply system for supplying gas along the outer periphery of the cutting tool 4, and the internal supply system for blowing and supplying gas via a hole formed in the cutting tool.

First, the cutting tool of the present invention that is used for controlled atmosphere cutting, in which a gas supply hole 4b connected to the supply side of atmospheric gas is formed in the tool 4 and an exhaust hole 4c of the gas supply hole 4b is opened on the tip of the body of the tool 4, wherein the exhaust hole 4c is opened in a direction of blowing atmospheric gas to the cutting edge 4a on the cutting blade of the tool 4.

Second, the tool 4 is an end mill, the gas supply hole 4b is formed in the axial direction in the end mill, and the gas supply hole 4b is divided at the tip of the tool so that the exhaust hole 4c is opened to the cutting edge 4a of each cutting blade.

According to the present invention configured thus, a high concentration of oxygen is supplied as cutting atmospheric gas to bring the cutting portion into an oxidized atmosphere containing a high concentration of oxygen, so that when a work material and a tool contain an element for forming an oxide protective film, wear is reduced on the tool by stably forming the oxide protective film between the cutting edge of the tool and the work material or adhering the film to a surface of the cutting edge of the tool. Then, the high concentration oxygen is supplied to the cutting portion in a concentrated manner, so that the cutting portion and the tool are cooled.

Further, the performance of a coating tool for providing lubricity by forming an oxide is sufficiently obtained and machining achieving the above effects can be realized with a relatively simple device at low cost.

Furthermore, according to the cutting tool of the present invention, the tool of the present invention makes it possible to positively supply gas to the cutting edge (machining portion) all the time regardless of the shape of the cut portion of the cut material, and sufficiently obtain the effect of atmospheric gas as well as the above effect.

DRAWING REFERENCE NUMERALS

4: tool
4a: cutting point
4b: gas supply hole
4c: exhaust hole

DETAILED DESCRIPTION OF THE PREFERRED EMBODIMENT

An embodiment of the present invention will be described in detail.

In the following embodiment of the present invention, gas with a high concentration of oxygen (oxygen enriched gas) that is extracted from the atmosphere or a gas bomb is blown around the cutting edge of a tool, an oxide is formed on a work surface (new surface) of a material in an oxygen enriched atmosphere or the cutting edge of the tool is brought into an oxidized atmosphere for a belag product material, and TiC in the tool that is a condition for adhering a protective film is subjected to oxidation on a surface of the tool to form $TiO_2$.

Further, the present invention promotes the formation of an oxide of FeO from Fe contained in a work material, and stably forms or adheres an oxide protective film between the cutting edge of the tool and a surface of the work material. The oxide protective film has as the main component an oxide made of a material such as Si, Mn, Al, and Mg which are the components of steel, cast iron, mold steel, and soon. Hence, direct contact is prevented between the tool and a work piece or chips thereon and wear is reduced in a more positive manner.

Further, in order to obtain the performance of a coating tool for providing lubricity by forming an oxide, gas is blown in an atmosphere of enriched oxygen or oxygen enriched gas is blown.

On the coating tool for providing lubricity, lubricity is provided by forming an oxide. For example, an element such as TiBON (B=boron) increasing the lubricity of an oxide is contained in a material, and the material is oxidized by cutting, so that a wear factor and so on is reduced and adhesion is prevented.

Thus, an atmosphere of oxygen enriched gas is used to promote the formation of a coating film of the oxide, so that wear on the tool is reduced and the tool lasts longer.

Figure 1:
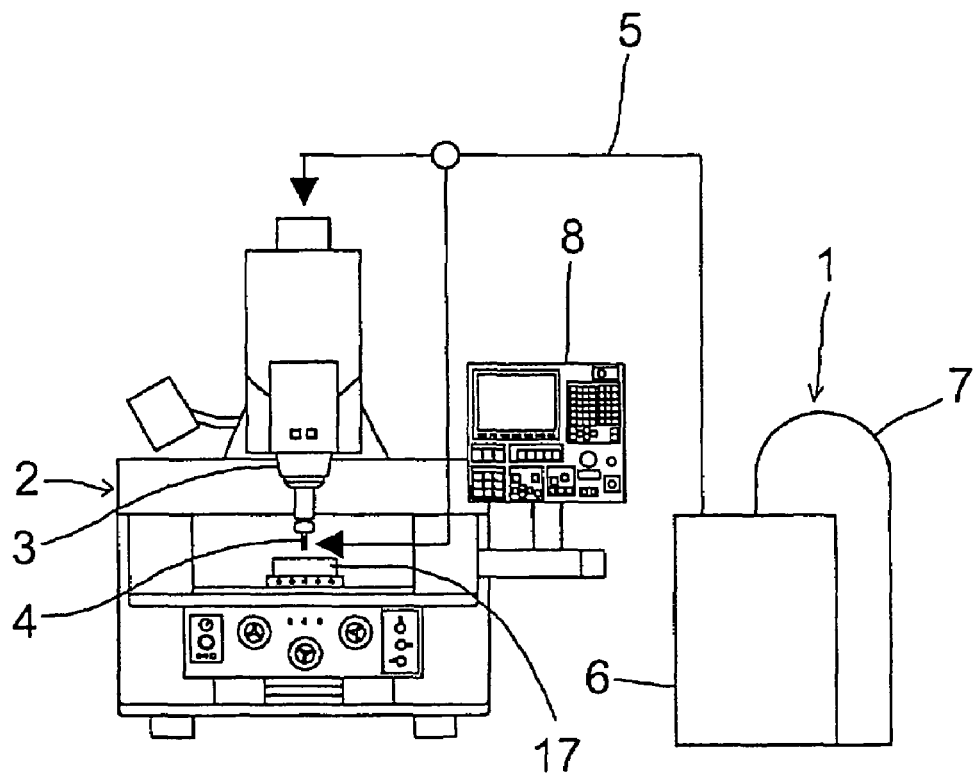
FIG. 1 is a schematic diagram showing a machining device for implementing the present invention.

The following will discuss an example of the present invention. As shown in FIG. 1, a machining device for implementing the method of the present invention is constituted of a gas feeder 1 (or gas bomb), a machine tool 2, a tooling 3, and a tool 4. The gas feeder 1 is constituted of an oxygen enrichment unit 6, a tank 7, a control unit 8, a solenoid valve, an oxygen densitometer (any of them are not shown), and so on, and the gas feeder 1 supplies gas with a predetermined oxygen concentration to the machine tool 2. The machine tool 2 is applicable to any of a milling machine, a machining center, a lathe, a drilling machine, a hobbing machine, a grinder, and so on. In this example, end milling will be discussed as an example for a tool and a gas supplying method. An oxygen enrichment device disclosed in Japanese Patent Laid-Open No. 5-23809 is used as the gas feeder 1. A film disclosed in Japanese Patent Publication No. 7-77602 is used as an oxygen enriched film. These oxygen enrichment devices enrich oxygen by causing air to pass through the oxygen enriched film. Thus, it is possible to stably obtain gas with a high oxygen concentration of at least about 32.5% and obtain gas with the maximum concentration of 40% under present circumstances.

Figure 4:
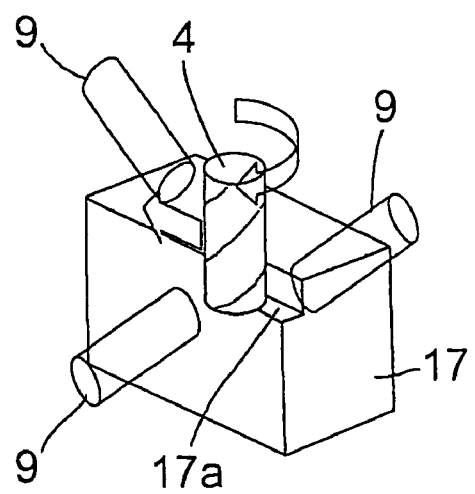
FIG. 4 is a perspective view showing another embodiment of a gas supplying method according to the present invention.

The tooling 3 attached to the machine tool 2 such as a milling machine and a machining center is a special holder of a center through type or a side though type and supplies gas from an internal supply hole formed on the tool. Alternatively with an ordinary holder, as shown in FIG. 4, gas may be blown around the cutting edge of the tool (end mill) 4 by using external nozzles 9. In the case of an internal supply system, a supplying method of covering a tool like an air curtain is available as well as the method of supplying gas from a supply hole. These methods may be combined.

Figure 2:
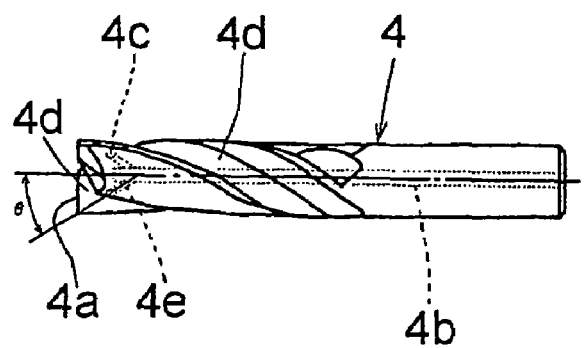
FIG. 2 is a side view showing an example of a cutting tool according to the present invention.

FIG. 2 is an overall side view showing the tool (end mill) 4 used for the present example. In this example, a tool of dual spiral type is used and a gas supply hole 4b is formed, at the center of the tool body, from the base end to the inside of the tip of the tool body. In the tip, an opening (gas exhaust hole) 4c is divided so that the opening 4c is opened to each cutting edge 4a in each groove 4d and is expanded to the outer periphery at an angle θ of inclination with respect to a divided hole 4e. Thus, gas supplied from the base end is blown in a concentrated manner onto the cutting edge 4a (i.e. cutting portion) of the tool 4 during a cutting operation.

Figure 3:
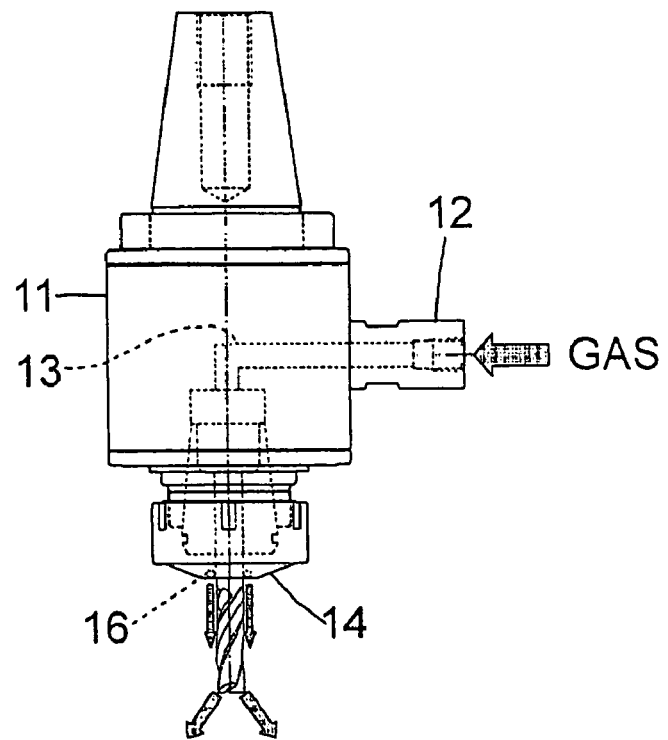
FIG. 3 is a front view showing an example of a tool holder used for implementing the present invention.

FIG. 3 is a schematic diagram showing a special holder 11 of the side through type and a state of gas blown when the tool is attached. A plug 12 for making connection with a gas supply pipe 5 is attached on the peripheral wall of the holder 11. A gas supply hole 13 is formed which is connected to the base end of the gas supply hole 4b (FIG. 2) of the attached tool 4 in the holder 11.

Further, on the lower end of the gas supply hole 13 in the holder 11, a ring-shaped opening 16 is provided in a collet nut 14 of the holder 11 on the outer periphery of the tool. In ordinary cases, oxygen enriched gas to be supplied is blown and supplied from the exhaust hole 4c on the tip of the tool 4 and the ring-shaped opening 16 along the outer periphery of the tool 4 to the tip of the tool. When the tool 4 does not have the gas supply hole 4b, gas is supplied only to the outer periphery of the tool.

However, on the ring-shaped opening 16, an insertable and removable O ring (not shown) is attached so as to close the opening 16. When the O ring is attached to the opening 16, gas supply from the ring-shaped opening 16 is stopped and gas is supplied only from the exhaust hole 4c. Insofar as the measurement results of oxygen concentrations in a cutting atmosphere are concerned, it is desirable to use the combination of the gas supplying methods.

FIG. 4 is a schematic diagram showing that the plurality of gas supply nozzles 9 blow gas to the tip (machining portion) of the tool 4 on a workpiece 17. In this example, a step 17a is formed on a corner of the workpiece 17. In this state, gas is blown from the exhaust hole 4c opened to the cutting edge 4a, so that the gas is supplied to the machining portion in a positive manner.

Figure 5:
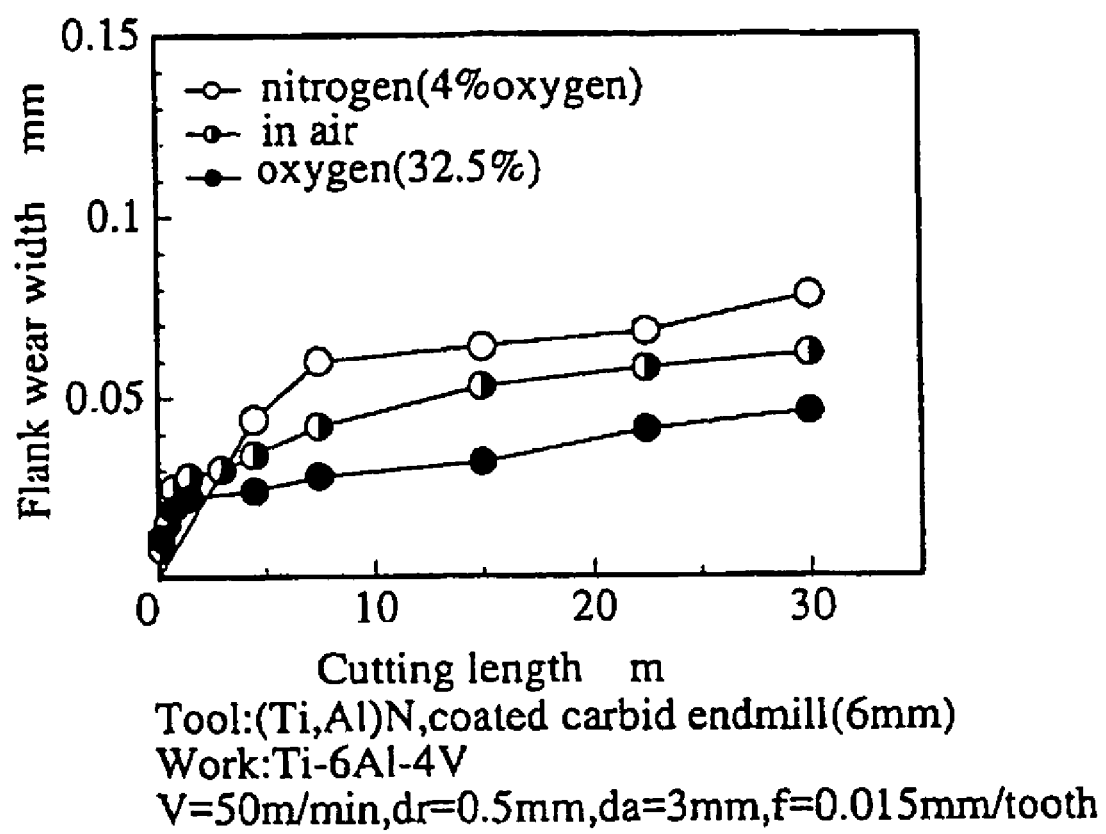
FIG. 5 is a graph showing the development of wear on a side blade when a titanium alloy is cut.

FIG. 5 is a graph showing the development of wear on the flank of the cutting point on the side of the end mill in the case where supply gas is varied in oxygen concentration and a titanium alloy is cut in the same conditions (cutting velocity V=50 m/min, a depth of cut in the radius direction dr=0.5 mm, a depth of cut in the axial direction da=3 mm, feed rate f=0.015 mm/tooth). As is evident from FIG. 5, nitrogen gas blow with low oxygen has larger initial wear as compared with air and oxygen enriched gas. In contrast, as an oxygen concentration increases from the air to a high oxygen concentration (32.5% $O_2$) in the cutting atmosphere, wear becomes smaller.

Figure 6A:
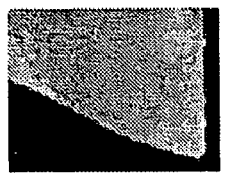
FIGS. 6A, 6B, and 6C are enlarged photographs showing a wearing state of the tool when the titanium alloy is cut in an atmosphere of nitrogen gas, in the air, and an atmosphere of a high concentration of oxygen.
Figure 6A:
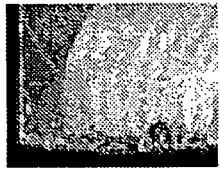
Figure 6A:
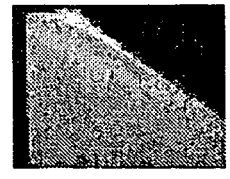
Figure 6B:
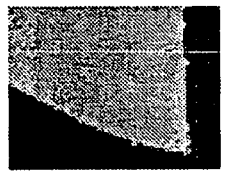
Figure 6B:
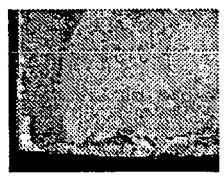
Figure 6B:
Figure 6C:
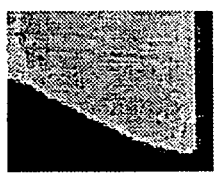
Figure 6C:
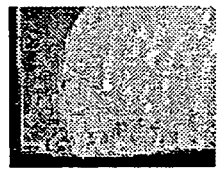
Figure 6C:

FIGS. 6A, 6B, and 6C are enlarged photographs showing a wearing state around a corner (cutting edge) of the end mill when nitrogen, air, and oxygen enriched gas are supplied as atmospheric gas and cutting is performed by a cutting length L=30 m. (a), (b), and (c) in the figures indicate an end face, an inside surface of the groove side, and an outer peripheral surface on the cutting edge of the tool.

FIG. 6A shows that nitrogen blow has larger flank wear near the corner as compared with air and oxygen enriched gas. This is because a cut surface (new surface) is not oxidized at a low concentration of oxygen and highly active titanium adheres to a surface of the tool and grows due to adhesion and exfoliation. In contrast, wear is hardly observed in the air of FIG. 6B, though chips adhering to a cutting point are observed.

In the case of a higher concentration of oxygen, chips adhering to the cutting point are not observed and wear is hardly observed as shown in FIG. 6C. This is because highly active titanium is separated from direct contact with the surface of the tool as a result of the formation of an oxide on the new surface and thus adhesion and exfoliation are reduced.

Given that the results are based on a difference in a degree of oxidation (a difference in a degree of formation of an oxide), it is assumed that a larger difference is made by a higher temperature which enhances oxidation, that is a higher cutting velocity on the cutting edge of the tool.

Figure 7A:
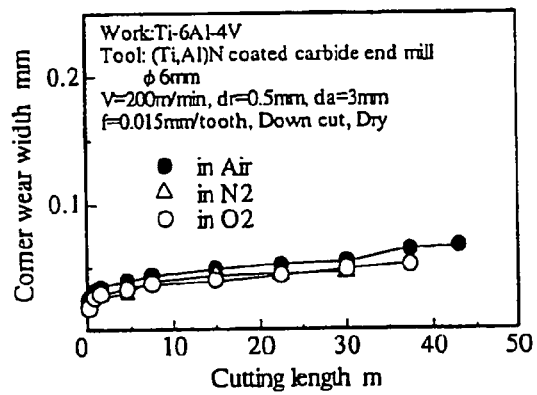
FIGS. 7A and 7B are graphs showing a wearing state on a corner and a cutting point on the side of the tool when the titanium alloy is cut in an atmosphere of nitrogen gas, in the air, and an atmosphere of a high concentration of oxygen.
Figure 7B:
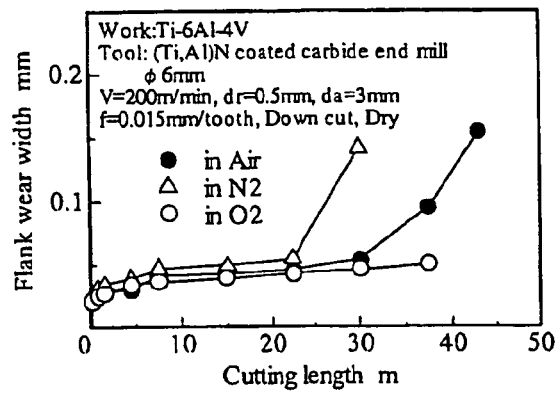

FIGS. 7A and 7B are graphs showing test results of influence on wear of the tool in the cutting atmosphere when a titanium alloy is cut at a cutting velocity of 200 m/min, regarding wear on a corner of the tool and a side cutting point. The other conditions are the same as those of the above example. Although wear on the corner (cutting edge) is not varied by a difference in atmosphere, wear on the side cutting point interferes with cutting at a low cutting velocity as the concentration of oxygen decreases. In this case, wear increases around a boundary, a burr occurs on a material because the cutting point of the tool decreases in sharpness, and the tool reaches the end of life. From the above description, it is understood that machining for reducing adhesion by forming an oxide in an atmosphere of high oxygen (enriched oxygen) is effective for a material such as a titanium alloy.

As described above, for some recent coating materials, a coating is developed which contains an element providing an oxide with high lubricity, oxidizes the element with cutting heat, and provides a coating film with lubricity (e.g. TiBON). An atmosphere of enriched oxygen is effective for promoting the formation of an oxide made of such coating materials and obtaining the performance of a coating tool.

Figure 8A:
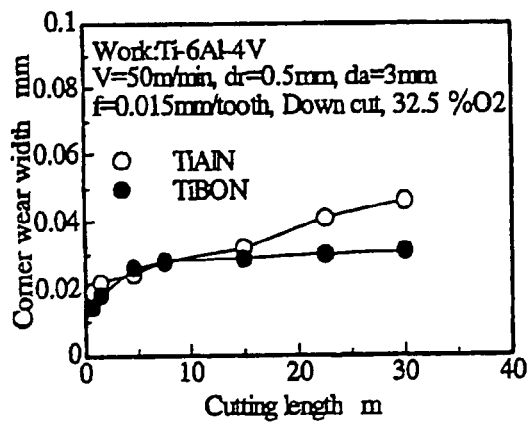
FIGS. 8A and 8B are graphs showing comparison results on the development of wear on a corner and a cutting point on the side of the tool when the titanium alloy is cut by a conventional TiAlN coating tool and a TiBON coating tool for providing lubricity by forming an oxide.
Figure 8B:
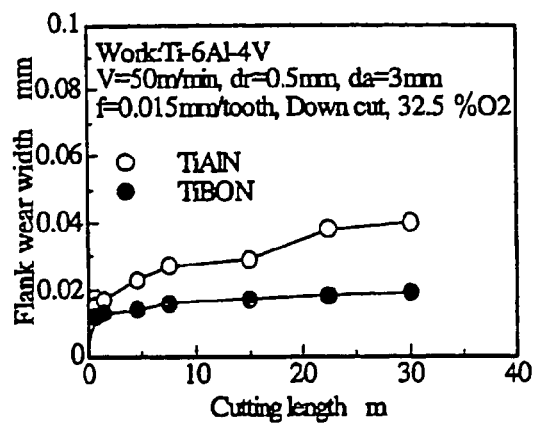

For example, FIGS. 8A and 8B show comparison results on the development of wear on the cutting edge (corner) and the side cutting point of the tool when a titanium alloy is cut by a conventional TiAlN coating tool and a TiBON coating tool which provides lubricity by forming an oxide. The cutting conditions of the tools are shown in the graphs. The results indicate that a lubricant coating hardly develops wear after initial wear occurs, though the conventional coating achieves cutting performance to a certain degree. An amount of wear is about half that of TiAlN when cutting is performed by a cutting length of 30 m. Assuming that this state continues, quite a large difference in life is expected (at least several to ten several times). It is believed that a great effect was obtained due to the high adhesiveness of the titanium alloy.

The above embodiment discussed that the end mill was used as a tool. The method and the cutting tool of the present invention are applicable to a milling cutter, a drill, a cutting tool of cemented carbide, and other cutting tools as long as the materials of a workpiece and the tool are suitable. Further, it is believed that efficiency improves as supply gas has a higher concentration of oxygen as long as materials form an oxide protective film during cutting. It is not always necessary to have a concentration of 32.5% indicated in the example. At least oxygen has to be enriched higher than an oxygen concentration in the air to generate an atmosphere of a high oxygen concentration. It is also possible to use gas with an oxygen concentration of about 40% of enriched oxygen.

What is claims is:

1. A controlled atmosphere cutting method, comprising the steps of:
   providing a workpiece and a cutting tool with a cutting edge, the workpiece and at least the cutting edge of the cutting tool being fabricated from a material susceptible to formation an oxide film thereon;
   cutting the workpiece with the cutting edge of the cutting tool; and
   supplying gas adjacent to where the workpiece is being cut, the gas containing a concentration of oxygen sufficient to form an oxide film between the cutting edge of a cutting tool and the workpiece as the workpiece is being cut.

2. The controlled atmosphere cutting method using oxygen enrichment according to claim 1, wherein the atmospheric gas is oxygen enriched air in which oxygen in air is condensed.

3. The controlled atmosphere cutting method using oxygen enrichment according to claim 1 or 2, wherein the atmospheric gas has an oxygen concentration up to 40%, exceeding an oxygen concentration of air.

4. The controlled atmosphere cutting method using oxygen enrichment according to claim 1 or 2, wherein the atmospheric gas is supplied to the machining portion by one or two or more of the external supply system for blowing gas from an outside of a cutting device by using a nozzle, a peripheral supply system for supplying gas along an outer periphery of the cutting tool, and the internal supply system for blowing and supplying gas via a hole formed in the cutting tool.

5. The controlled atmosphere cutting method according to claim 1, wherein the workpiece and the cutting tool are oxide-free prior to the step of cutting the workpiece.

6. The controlled atmosphere cutting method according to claim 1, wherein the oxygen concentration is in a range of approximately 32% and 40%.

* * * * *